United States Patent

Boelkins

[15] 3,707,168
[45] Dec. 26, 1972

[54] ROTARY SPOOL VALVE

[72] Inventor: Wallace G. Boelkins, Grand Rapids, Mich.

[73] Assignee: Uni-Mist, Inc., Grand Rapids, Mich.

[22] Filed: Sept. 30, 1970

[21] Appl. No.: 76,695

[52] U.S. Cl. ............................................. 137/625.48
[51] Int. Cl. ............................................. F16k 11/02
[58] Field of Search ......... 137/625.4, 625.46, 625.48, 137/625.39, 614.11; 74/56, 57

[56] References Cited

UNITED STATES PATENTS

| | | | |
|---|---|---|---|
| 3,156,271 | 11/1964 | Schnurmann | 251/340 X |
| 3,367,626 | 2/1968 | Stern | 251/340 |
| 3,482,740 | 12/1969 | Evans et al. | 137/625.4 X |
| 3,503,540 | 3/1970 | Fuerst | 137/625.4 X |
| 3,492,880 | 2/1970 | Pearson | 74/57 |
| 3,389,639 | 6/1968 | Asche | 137/625.48 X |
| 3,563,349 | 2/1971 | Spieth et al. | 137/614.11 X |
| 2,684,691 | 7/1954 | Strickler | 137/625.4 X |
| 3,044,491 | 7/1962 | Sangster | 137/625.48 X |
| 3,270,360 | 9/1966 | Kropp | 74/56 |
| 3,324,886 | 6/1967 | Way | 137/625.48 |
| 3,402,642 | 9/1968 | Hecke et al. | 137/625.48 X |

*Primary Examiner*—Samuel Scott
*Attorney*—Price, Heneveld, Huizenga & Cooper

[57] ABSTRACT

The specification discloses a spool valve including a spool mounted within a passage within a valve body. The spool can be rotated by means of a knob and includes a pin extending into a helical slot in the valve body such that rotation of the spool results in its axial movement to thereby control the flow of fluid between various lateral passages extending through the valve body and communicating with the passage therethrough. A spring-biased ball held by the valve body rides across a camming surface on the spool to provide a detent for spool movement and to bias the spool towards either one or the other of its possible positions.

6 Claims, 6 Drawing Figures

PATENTED DEC 26 1972 3,707,168

INVENTOR.
WALLACE G. BOELKINS
BY Price, Heneveld
Huizenga & Cooper
ATTORNEYS

ROTARY SPOOL VALVE

BACKGROUND

This invention relates to spool valves. Conventionally, these valves comprise a spool mounted for axial movement within an internal passage in a valve body. By shifting the spool axially, one can control the flow of fluid between various lateral passages in the spool body which communicate with the internal passage.

There are a number of drawbacks to such conventional spool valves. First of all, it is difficult to tell at a glance what relative flow control position the spool is in with respect to the valve body. This is because only a small amount of axial shifting is required to vary the flow result. Thus, one cannot tell whether the spool is set to allow flow between a given pair of passages or to block flow therebetween.

Spool valves may include resilient sealing members, such as rubber O-rings, mounted on the spools to constitute a flow blocking or sealing means, but in order to adjust the valve between a flow and non-flow condition, one must move the resilient seal past the opening of a lateral passage. The resulting abrasion between the edges of the opening and the resilient seal causes considerable wear and tear on the seal and minimize its life expectancy.

The present invention comprises a spool valve having a spool mounted in an internal passage in a valve body for controlling fluid flow therethrough. In accordance with this invention, however, means are provided for rotating the spool and for moving the spool axially with respect to the valve body in response to such rotation. Because the spool is in effect rotated between flow and non-flow positions, the spool rotating means can be provided with an indicator whereby the relative position of the spool within the valve body can be definitely and unmistakably ascertained merely by glancing at the indicator. Furthermore, actuation is readily accomplished in a very sure and positive manner.

In other aspects of the invention, the spool-moving means comprises a helical guide such that a given point of the surface of the spool describes a generally helical path during rotation of the spool. Thus, O-rings may be used as seals, since as the same move past an opening from a lateral passage, they do so through a helical path and thereby undergo much less wear and tear than would be the case if they were drawn or dragged straight across the passage opening. Wear and tear is further minimized by providing the lateral passage past which the O-ring travels with two smaller openings into the axial valve passage rather than one larger opening.

In another aspect of the invention, the spool is biased alternatively to a first or second axial position whereby rotation of the spool results in a positive shift thereof from one of its axial positions to the other. This results in positive on-off control and thereby further improves the ease with which the relative position of the spool within the valve body can be determined.

BRIEF DESCRIPTION OF THE DRAWINGS

These and other objects and advantages of this invention will be better understood and appreciated by reference to the appended specification and drawings wherein.

PREFERRED EMBODIMENT

Figure 2:
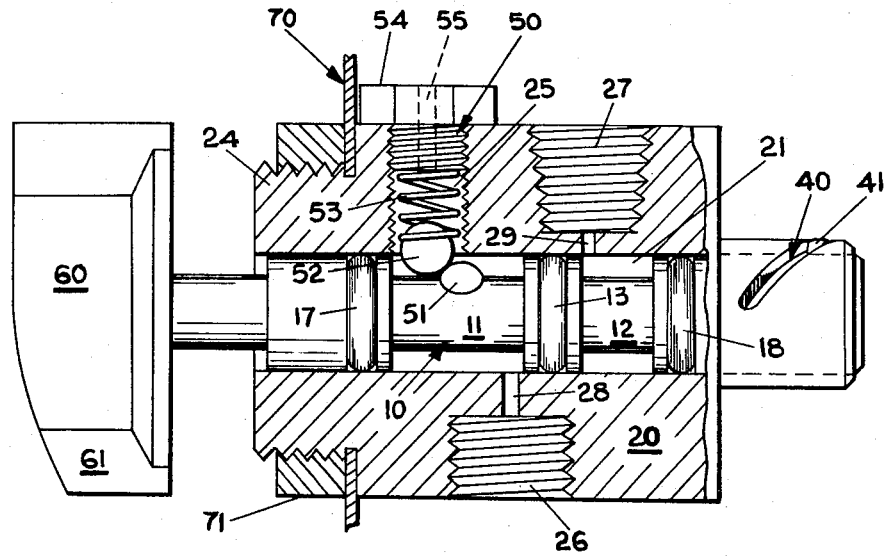
FIG. 2 is a partial cross-sectional view of the spool valve with the spool being shown in a second axial position.
Figure 1:
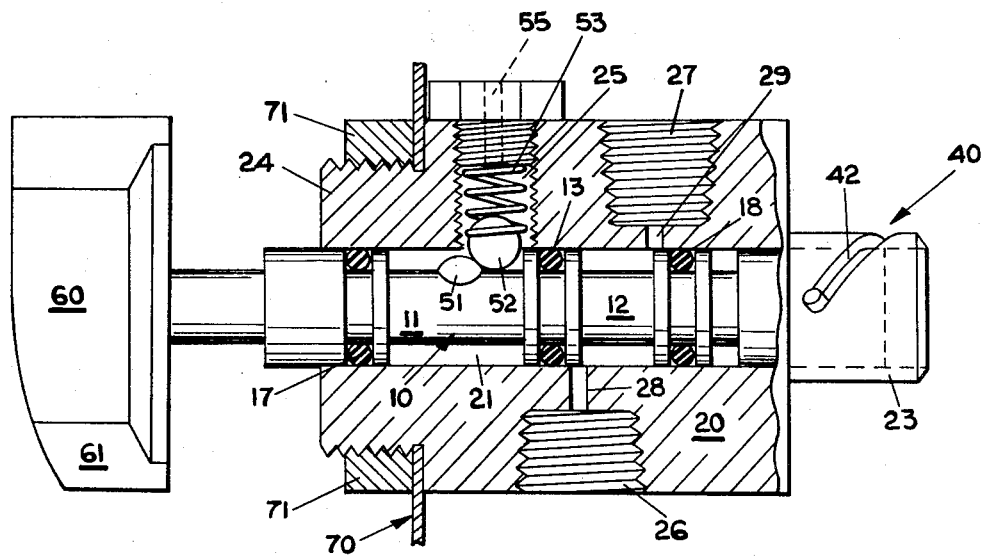
FIG. 1 is a partial cross-sectional side elevational view of the spool valve with the spool being shown in a first axial position.
Figure 5:
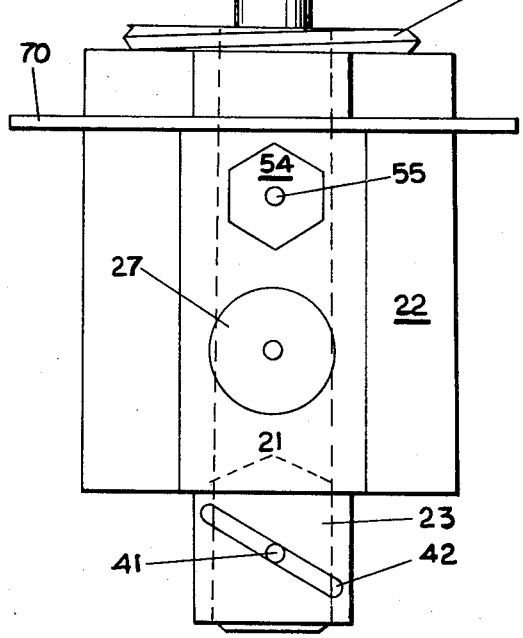
FIG. 5 is a top plan view of the spool valve.

In the preferred embodiment, the invention comprises a spool 10 mounted within a valve body 20. Spool 10 can be rotated by means of a knob 60 mounted thereon and is shifted axially with respect to valve body 20 in response to such rotation due to the action of a helical guide assembly 40 (FIGS. 1, 2 and 5). A bias assembly 50 biases spool 10 alternatively to either a first axial position as shown in FIG. 1 or to a second axial position as shown in FIG. 2. A determination of which relative position spool 10 is in can be made by observing the angular position of knob 60 with respect to an indicator plate 70.

Figure 3:
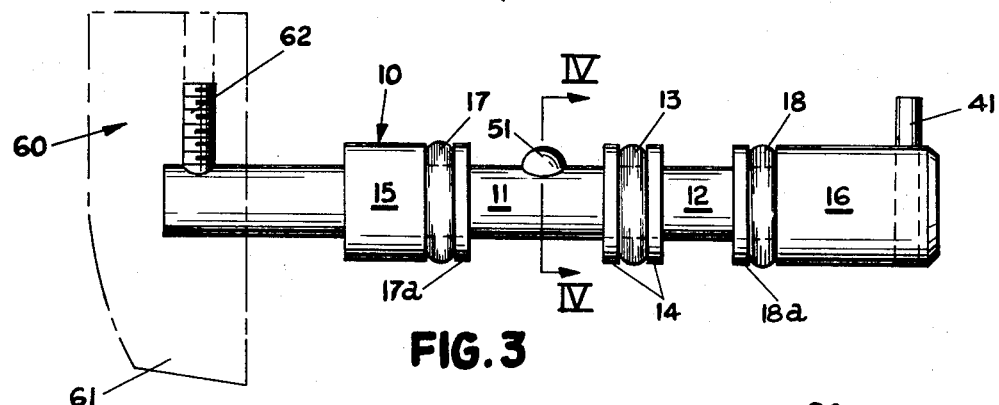
FIG. 3 is a plan view of the spool alone.

Spool 10 is mounted for rotational and axial movement within an axial passage 21 which extends through the center of valve body 20 (FIGS. 1 and 2). The flow-controlling section of spool 10 is flanked by a front bearing portion 15 and by a rear bearing portion 16 (FIG. 3). These bearing portions have diameters which are approximately equal to (i.e., closely approach) the inside diameter of axial passage 21. The flow-controlling area of spool 10 comprises a shaft which is divided into a front fluid passing portion 11 and a rear fluid passing portion 12 by a flexible O-ring 13 which is held in position by a pair of radial flanking ribs 14 which are integral with the spool. A front seal is provided by a front O-ring 17 held in place by front bearing portion 15 and a rib 17a, and a rear seal is provided by a similar flexible O-ring 18 which is held in place by rear bearing portion 16 and a rib 18a. Portions 11 and 12 are narrower in diameter than the inside diameter of axial passage 21 such that fluid is free to flow within these portions, between the spool and the valve body (FIGS. 1 and 2).

Valve body 20 comprises a central portion 22 (FIG. 5) having a hexagonal cross section in this particular embodiment, a rear cylindrical extension 23 and a front threaded extension 24 (FIG. 5). Axial passage 21 extends from the front of valve body 20 to the rear thereof, through all three of these sections 22, 23 and 24.

Figure 6:
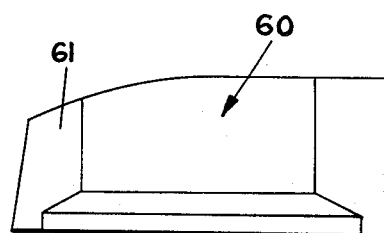
FIG. 6 is a bottom plan view of the spool valve with the front portion broken away.
Figure 6:
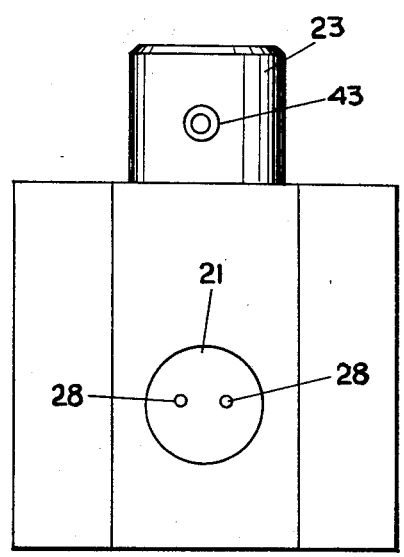

Extending laterally inwardly through the central portion of valve body 20 are a first threaded passage 25, a second threaded passage 26 and a third threaded passage 27 (FIGS. 1 and 2). First threaded passage 25 communicates directly with axial passage 21. However, second passage 26 communicates with axial passage 21 through a pair of adjacent fluid flow passages 28 which are considerably smaller in diameter than threaded passage 26 (FIGS. 1, 2 and 6). Third threaded passage 27 communicates with axial passage 21 through a single lateral fluid passage 29 which is smaller in diameter than threaded passage 27. The combined cross-sectional area of the two passages 28 may be equal to or greater than the cross-sectional area of the passage 29, even though the passages 28 are smaller in diameter than passage 29, such that the fluid flow capacity through the two passages 28 will be equal to or greater than the fluid flow capacity of the single passage 29.

Helical guide assembly 40 includes a pin 41 which is rigidly mounted on the end portion 16 of spool 10 (FIG. 3), as by being press-fitted into a hole which extends laterally through end portion 16 of spool 10. Pin 41 extends laterally from spool 10 and into a helical slot 42 which is cut into the cylindrical extension 23 of valve body 20 (FIG. 5). Preferably, slot 42 extends through an arc of 90° or more, and extends an axial distance sufficient to allow spool 10 to shift from its first to its second axial position. An access opening 43 (FIG. 6) is provided on the opposite side of cylindrical extension 23 so that if removal of spool 10 from valve 20 becomes necessary, a tool can be inserted into opening 43 and pin 41 can be driven out the opposite side.

Figure 4:
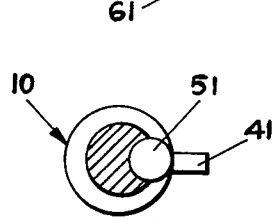
FIG. 4 is a cross section taken along the plane IV—IV of FIG. 3.

Bias assembly 50 comprises a small ball 51 which is seated in a depression in portion 11 of spool 10. Ball 51 protrudes from the surface of spool 10 to provide a camming surface (FIGS. 1, 2 and 4). As with any other spot on the surface of spool 10, this camming surface will be moved along a helical path when spool 10 is rotated. Positioned at the center of that helical path is a ball 52 which is mounted for lateral movement within first passage 25 of valve body 20. Ball 52 is biased towards engagement with spool 10 by a spring 53, held in place within first threaded passage 25 by a threaded cap fitting 54 (FIGS. 1, 2 and 5). Cap 54 includes a narrow flow passage 55 therethrough such that the axial passage 21 in the valve body can be vented through first threaded passage 25 and flow passage 55.

Knob 60 can be any conventional knob having a pointer portion 61 and can be held on the end of spool 10 by means of a set screw 62 (FIG. 3). The relative angular position of knob 60 can be determined by observing the relative position of pointer 61 with respect to indications on an indicator plate 70. The latter is secured to the front of valve body 20 by being slipped over front threaded portion 24 and held in place by means of a securing nut 71. Preferably, indicator plate 70 and the rear of threaded portion 24 include inter-fitting indexing portions such as mating irregularities, such that indicating plate 70 is properly oriented or indexed as soon as it is secured to valve body 20. Generally, indicator plate 70 will be provided with an "on" indication and an "off" indication to indicate either the existence or the non-existence of fluid flow between second threaded passage 26 and third threaded passage 27.

OPERATION

In operation, three fluid flow lines may be secured to valve body 20. Of these, a first feed line will be secured to second threaded passage 26, and fluid flowing therethrough will flow either to a line in flow communication with threaded passage 25 and fluid flow passage 55 or to a line communicating through threaded passage 27 and flow passage 29. The flow line in communication with passage 55 might well be a return line which would allow one to block the flow of fluid to threaded passage 27 without creating a pressure buildup in the feed line to second passage 26.

When spool 10 is in its first axial position as shown in FIG. 1, fluid will flow through threaded passage 26 and through the two narrower flow passages 28 into the axial passage 21. From thence it will flow out of valve body 20 through fluid passage 29 and third threaded passage 27. When spool 10 is in this position, pointer 61 of knob 60 will point to an "on" indication on indicator plate 70.

Spool 10 can be moved to its second axial position as shown in FIG. 2 by rotating knob 60. As spool 10 is rotated, pin 41 follows helical slot 42 in valve body 20. Thus, if one is rotating spool 10 from the position indicated in FIG. 1, it tends to slide rearwardly (i.e., further into the valve body) until pin 41 contacts the opposite end of helical slot 42. In the alternative, as spool 10 is turned from its off position as indicated in FIG. 2, it slides forwardly due to the action of pin 41 following helical slot 42.

Ball 52 and spring 53 act to bias spool 10 alternatively to either the first or second axial position. This insures positive on-off control of the valve. As knob 60 is rotated, ball 51 passes beneath ball 52. Because ball 51 comprises a protruding cam surface, ball 52 is forced upwardly against the action of spring 53. Once spool 10 has been rotated a certain distance, ball 51 will pass top center of ball 52 and will then be forced to the opposite side thereof by the downward force exerted on ball 52 by spring 53. Thus, one will rotate knob 60 a certain distance until the biasing action of ball 52 and spring 53 on ball 51 take over and automatically force spool 10 to rotate the rest of the way into its second axial position as shown in FIG. 2. One can thereby always be sure that the spool 10 is either in its first or second axial position and not somewhere in between.

When spool 10 is in the position shown in FIG. 2, fluid flow from the passages 28 to passage 29 is prevented by the presence of O-ring 13 therebetween. However, fluid does flow into axial passage 21 and out through fluid passage 55 in cap 54. As stated before, this could be a return line to a reservoir whereby a pump on the feed line connected to second threaded passage 26 could continue to operate without building up pressure. When spool 10 is in its second axial position as shown in FIG. 2, pointer 61 on knob 60 would point to an off indication on indicator plate 70.

The relative axial position of the spool can be readily determined by reference to a pointer on knob 60. Because helical slot 42 describes an arc of about 90°, knob 60 is also rotated through the same arc, and thus its relative position is readily apparent. Further, one can always be sure that the valve is in either its "on" or "off" position and not somewhere in between. If this were a conventional spool valve, it would be considerably more difficult to determine the relative axial position of spool 10 since it only need be moved a relatively short axial distance in order to change the flow condition of the valve.

Furthermore, the helical motion of resilient O-ring 13 past the small passages 28 results in much less wear and tear on O-ring 13 than would be the case f the latter were drawn directly, i.e., axially, across the surfaces of these openings. Additionally, the fact that two smaller openings are used in place of one larger one further reduces the wear and tear on O-ring 13, since this measure helps to eliminate the gouging or digging effect which the edges of larger openings inevitably have upon O-rings or like resilient sealing members.

It is understood that the above is merely a preferred embodiment of the invention and that a number of changes and alterations can be made thereof without departing from the spirit and broader aspects of the invention.

The embodiments of the invention in which an exclusive property or privilege is claimed are defined as follows.

1. A spool valve comprising a spool mounted in a valve body for controlling fluid flow therethrough in response to axial spool movements; means for rotating said spool; means for moving said spool axially with respect to said body in response to the rotation of said spool comprising a slot of axially and laterally curved configuration defined by one of said body or said spool and a pin means projecting laterally from the other of said body and spool and extending into said slot such rotation of the spool with respect to said body produces direct axial movement therebetween as a result of the forced movement of the pin means within the said slot; and means for biasing said spool into one of at least two axial positions upon rotation of said spool, such that rotation results in a biased shift from one of said axial positions to another.

2. A spool valve comprising a spool mounted in a valve body for controlling fluid flow therethrough in response to axial spool movements; means for rotating said spool; means for moving said spool axially with respect to said body in response to the rotation thereof comprising means for guiding the movement of said spool such that a point on its surface describes a generally helical path during said rotation thereof; an internal passage within said valve body, and said spool disposed in said passage; means for securing at least two fluid lines to said valve body, between which flow is to be controlled; said fluid line-connecting means comprising one lateral passage connecting one such line to said internal passage and at least two lateral passages connecting the other such line to said internal passage, the combined cross-sectional area of said two passages being approximately equal to or greater than the cross-sectional area of said one passage; a resilient sealing member being secured to said spool in a position for movement with said spool from a position between said one lateral passage and said two lateral passages past said two lateral passages, whereby all of said lateral passages communicate through said internal spool passage.

3. A spool valve comprising: a spool mounted in an internal passage in a valve body for controlling fluid flow therethrough; means for rotating said spool; pin means projecting laterally from said spool into a generally helical slot in said valve body whereby rotation of said spool results in axial movement thereof; a cam surface projecting laterally from the surface of said spool; a ball mounted in a passage in said valve body extending laterally of said internal passage and being biased by a spring means in said lateral passage into the path followed by said cam surface such that rotation of said spool causes said cam surface to be cammed either to one side or the other of said ball.

4. The spool valve of claim 3 which comprises a first means and a second means for conducting a flow of fluid through said valve body and being in flow communication with said internal passage; said spool including a resilient sealing means secured thereto for movement therewith, from a position between said first and second flow means, past said first flow means to a position between said first flow means and said lateral passage; said lateral passage including a third means for conducting a flow of fluid through said valve body and being in flow communication with said passage.

5. The spool valve of claim 4 in which said second fluid flow means comprises a second passage extending laterally of and into said internal passage and said first fluid flow means comprises a plurality of adjacent passages extending laterally of and into said internal passage whose combined cross-sectional area is equal to or greater than the cross-sectional area of said second lateral passage.

6. A spool valve comprising a spool mounted in a valve body for controlling fluid flow therethrough in response to axial spool movements; an internal passage within said valve body, and said spool disposed in said passage; means for securing at least two fluid lines to said valve body, between which flow is to be controlled; said fluid line-connecting means comprising one lateral passage connecting one such line to said internal passage and at least two lateral passages connecting the other such line to said internal passage, the combined cross-sectional area of said two passages being approximately equal to or greater than the cross-sectional area of said one passage; a resilient sealing member being secured to said spool in a position for movement with said spool from a position between said one lateral passage and said two lateral passages past said two lateral passages, whereby all of said lateral passages communicate through said internal spool passage.

* * * * *